US008099778B2

(12) United States Patent
Courtin et al.

(10) Patent No.: US 8,099,778 B2
(45) Date of Patent: Jan. 17, 2012

(54) METHOD FOR ACCESS CONTROL TO CONDITIONAL ACCESS DATA

(75) Inventors: Nicolas Courtin, Cossonay-Ville (CH); Olivier Brique, Corseaux (CH); Jimmy Cochard, Attalens (CH); Christophe Gogniat, Chavannes-près-Renens (CH)

(73) Assignee: Nagravision S.A., Chesaux-sur-Lausanne (CH)

( * ) Notice: Subject to any disclaimer, the term of this patent is extended or adjusted under 35 U.S.C. 154(b) by 1360 days.

(21) Appl. No.: 11/288,223

(22) Filed: Nov. 29, 2005

(65) Prior Publication Data
US 2006/0117392 A1 Jun. 1, 2006

(30) Foreign Application Priority Data

Nov. 29, 2004 (EP) ..................................... 04106163

(51) Int. Cl.
*G06F 7/04* (2006.01)
*G06F 12/00* (2006.01)
(52) U.S. Cl. ............................. 726/17; 725/86; 725/105
(58) Field of Classification Search ................... 726/17; 725/86, 105
See application file for complete search history.

(56) References Cited

U.S. PATENT DOCUMENTS

| 6,005,938 | A | 12/1999 | Banker et al. | |
|---|---|---|---|---|
| 6,964,060 | B2 * | 11/2005 | Kamperman et al. | 725/31 |
| 2006/0155989 | A1 * | 7/2006 | Nishimoto et al. | 713/166 |
| 2007/0133797 | A1 * | 6/2007 | Schipper et al. | 380/231 |

FOREIGN PATENT DOCUMENTS

| EP | 0 256 596 B1 | 2/1988 |
|---|---|---|
| EP | 0 708 561 B1 | 4/1996 |
| FR | 2 848 764 | 6/2004 |
| JP | 11-308595 | 11/1999 |
| JP | 2004-186714 | 7/2004 |
| WO | WO 02/062054 A2 | 8/2002 |
| WO | WO 03/069910 A1 | 8/2003 |

OTHER PUBLICATIONS

"Functional Model of a Conditional Access System", EBU Review-Technical, European Broadcasting Union, Brussels, BE, No. 266, Dec. 21, 1995, pp. 64-77.
International Search Report.

* cited by examiner

*Primary Examiner* — Christopher Brown
(74) *Attorney, Agent, or Firm* — Harness, Dickey & Pierce, P.L.C.

(57) ABSTRACT

A method is disclosed for access control to conditional access data in a multimedia unit comprising at least one security module. This process includes:
reception by the multimedia unit of a control message ECM containing at least one control word cw; transmission of this message ECM to said security module, this control message being associated to a message decryption right; determination of a validity date of the ECM control message decryption rights associated to said security module; determination of the present date; comparison of the present date with the expiration date of the decryption rights and determination of whether the present date is prior to the expiration date. In the affirmative case, decryption of the control message ECM and sending of the control word cw to the multimedia unit occurs In the negative case, reading of a value contained in a counter of the security module and comparison of this value occurs, to determine whether this value is comprised within a range authorizing decryption. Further, in the affirmative case, modification of the value of the counter according to a pre-established rule, and decryption of the control message ECM and sending of the control word cw to the multimedia unit also occurs. Finally, in the negative case, access to the conditional access data is blocked.

18 Claims, 2 Drawing Sheets

METHOD FOR ACCESS CONTROL TO CONDITIONAL ACCESS DATA

PRIORITY STATEMENT

The present application hereby claims priority under 35 U.S.C. §119 on European patent application number EP 04106163.1 filed Nov. 29, 2004, the contents of which is hereby incorporated herein by reference

TECHNICAL FIELD

This invention relates to a method for access control to conditional access data in a multimedia unit comprising at least one security module.

It also concerns a security module for the access to conditional access data, this security module in particular being a removable security module of the smartcard type containing an initial credit and intended to be used in the field of the Pay-TV.

BACKGROUND

At present there are removable security modules such as smartcards containing an initial credit. These security modules, called pre-payment cards, are used in particular in association with decoders in the field of the Pay-TV or conditional access TV. In this context, they allow encrypted contents to be decrypted.

As it is well known, in such systems that use a security module, the content is encrypted by means of control words and is then sent to multimedia units connected to a data or content supplier. The controls words are sent to multimedia units in an encrypted form in control messages ECM. These control messages ECM are transmitted by the decoder of the multimedia unit to the security module of this unit. If the decryption rights are present, the control messages are decrypted in order to extract the control words. Said control words are returned to the decoder that uses them to decrypt the content.

In practice, the security modules do not initially contain any rights. These rights are transmitted during an initialization step that is generally carried out by a technician during the installation of the multimedia unit. This means that this module does not operate at the time of purchase of a prepaid security module. This represents a drawback for the user who, despite having made the purchase, cannot immediately access the service for which he has paid.

In order to avoid this drawback, it is possible to send authorization messages EMM for the activation of the security modules using short temporal intervals, the user should wait until his module has received such a message. However, this presents the drawback of the use of a large bandwidth that is not always available and that is expensive for the data supplier.

It is of course possible to introduce decryption rights during the personalization of the security module, namely at the end of the manufacturing process before this module is put on sale. The effect of this would be to render the card immediately functional when it is introduced into the decoder. However, this process is practically never implemented in reality. In fact, in the event of the theft of the security modules for example, it would be necessary to send authorization messages EMM containing on one hand an identifier of the stolen modules and on the other hand a deactivation command, in order to render these stolen modules inoperative. The processing of such authorization messages EMM can be blocked relatively easily. It would thus be difficult or even impossible to deactivate the stolen modules.

Therefore, an incompatibility arises between the immediate functioning of the security module as soon as it is introduced into a decoder and the capacity to deactivate a stolen security module or to deactivate it for other reasons.

The Japanese abstract JP 2004186714 describes a decoder/security module assembly that works in the following way: an authorization message EMM containing a number of authorized control messages ECM is sent to the decoder. This number of messages is stored in the security module. This security module includes a counting function that decreases one counter value every time a control message ECM is decrypted.

This embodiment presents several drawbacks. Firstly, the counter receives a number of control messages that are authorized to be decrypted in an authorization message. Therefore, when the security module is introduced into a decoder it is necessary to wait for the reception and processing of an authorization message EMM before the decoder will be functional. This invention does not thus allow the production of a security module that works from the moment it is introduced into a decoder.

Then, when the value of the counter has been introduced into the security module, it is only possible to deactivate the decoder by sending an authorization message EMM that terminates the rights. However, as it is well known, it is relatively easy to filter and eliminate these messages before the rights have been terminated. Therefore, a security module will only be deactivated when the number of control messages that it is authorized to decrypt has been reached, this termination being automatic. This invention does not allow the production of a security module that can be very quickly deactivated at will.

This invention proposes to produce a security module that will be immediately operational when it is introduced into any suitable decoder, without previous registration at a management centre. It also proposes to give an operator the possibility of deactivating one or more security modules, in particular in the case of module theft or in the case of certain modules being used in an unauthorized way.

SUMMARY

An aim of at least one embodiment of this invention is achieved by a method as defined in the preamble and characterized in that it includes the following steps:
  reception by the multimedia unit of a control message ECM containing at least one control word cw;
  transmission of this message ECM to said security module, this control message being associated to a message decryption right;
  determination of a validity date of the ECM control message decryption rights associated to said security module;
  determination of the present date;
  comparison of the present date with the expiration date of the decryption rights and determination of whether the present date is prior to the expiration date
    in the affirmative case, decryption of the control message ECM and sending of the control word cw to said multimedia unit;
    in the negative case, reading of a value contained in a counter of the security module and comparison of this value to determine whether this value is comprised within a range authorizing decryption;

in the affirmative case, modification of the value of the counter according to a pre-established rule, decryption of the control message ECM and sending of the control word cw to said multimedia unit;

in the negative case, blocking access to said conditional access data.

An aim may also be achieved by a method characterized in that it includes the following steps:

reception by the multimedia unit of a control message ECM containing at least one control word cw;

transmission of this message ECM to said security module, this control message being associated to a message decryption right;

reading of a value contained in a counter of the security module;

comparison of this counter value to determine whether this value is comprised within a decryption authorizing range;

in the negative case, blocking the access to said conditional access data;

in the affirmative case, decryption of the control message ECM and sending of the control word cw to said multimedia unit;

determination of a validity date of the ECM control message decryption rights associated to said security module;

determination of the present date;

comparison of the present date with the expiration date of the decryption rights and determination of whether the present date is prior to the expiration date;

in the affirmative case, authorization of the access to conditional access data;

in the negative case, modification of the value of the counter according to a pre-established rule and authorization of the access to conditional access data.

An aim of at least one example embodiment of the present invention may also be reached by way of a security module for the access to conditional access data, characterized in that it includes a counter intended to count the number of decrypted control messages ECM and blocking means of the display of the data when a predetermined decryption number has been reached.

According to at least one example embodiment of the present invention, rights are introduced into the modules during the personalization of these security modules. These rights allow the modules to function from the moment in which they are introduced into a decoder. These rights are however limited in such a way that they do not give access to the totality of the capacity of the security module. More particularly, the rights are limited in time.

Therefore, if the security module is not in communication with a management centre responsible for the transmission of the rights, the security module will only be able to function in a limited way. In order to be able to function using the capacities that have been provided, it will be necessary to allow communication between the management centre and the security module.

This allows the operator to prevent access to data by means of security modules that have been stolen or which are used illegally. This blocking of data access can be carried out actively by sending a blocking message in the form of a management message EMM. Blocking can also be carried out passively by not renewing the decryption rights. Therefore, if the management messages are blocked in order to eliminate the blocking instructions intended for a security module, this blocking will be carried out despite everything, in a passive way.

In this way the counter allows the module to function as soon as it is introduced into a decoder in order to satisfy the user. This allows the module to wait for the reception of a management message EMM renewing the rights. The main advantage of this counter is that it allows the duration of the cycle between two of these managements messages EMM to be increased thus safeguarding the bandwidth that is expensive for the Pay-TV operator. This is achieved without penalizing the user.

The initialization of this counter during the personalization of the module allows the working of this module without delay, during the first use, until the reception of the first management message EMM.

The updating of the counter at the same time as the updating of the intermediate validity date allows the working of the module without delay during further uses of the module until the reception of the next management message EMM. This prevents the penalization of the users who insert a module after a long period out of the multimedia unit.

The sending of the counter value in the management messages EMM allows the modification of this value according to the operational constraints. For example, it is possible to increase this value if the bandwidth available for management messages EMM decreases.

BRIEF DESCRIPTION OF THE DRAWINGS

This invention and its advantages will be better understood with reference to the enclosed drawings and to the detailed description of certain particular embodiments, in which.

DETAILED DESCRIPTION OF THE EXAMPLE EMBODIMENTS

Figure 1:
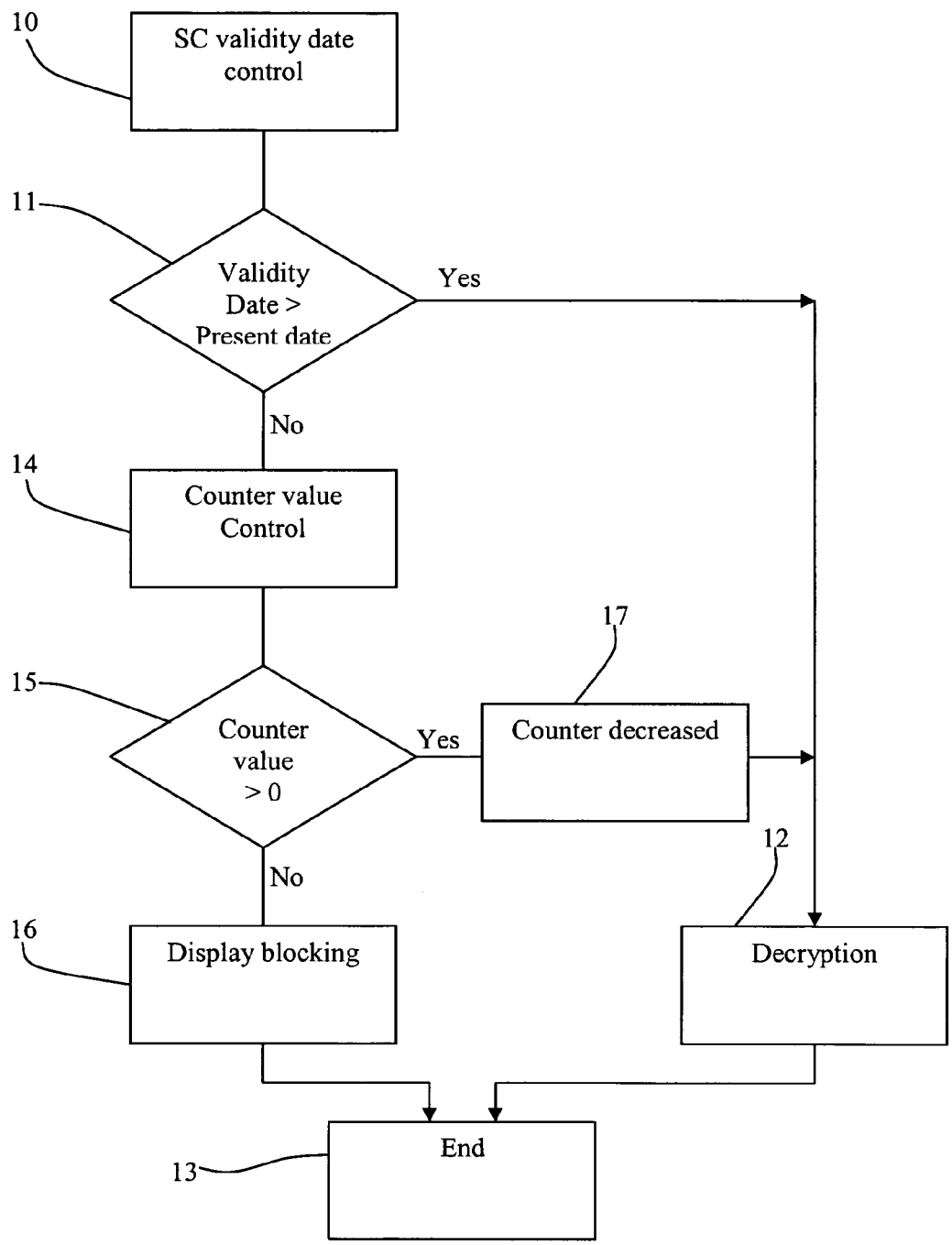
FIG. 1 shows the preferred embodiment of the method according to this invention.

FIG. 1, the process of an embodiment of the invention is explained in a particular application relating to conditional access television. In this application, a management centre sends conditional access data to a plurality of multimedia units each including a decoder and a security module. In the application in question, the security module is of the removable type and in particular can be produced in the form of a chip card. The module notably includes a counter whose function is explained below.

In a conventional way, the conditional access data such as that sent by the management centre form a Pay-TV content. This data is encrypted by way of control words cw. The control words cw are themselves encrypted and sent to the concerned users in the form of control messages ECM. The access rights to the encrypted contents can be sent to the users multimedia units in the form of authorization messages EMM.

When a user wishes to gain access to an encrypted content, the control messages received by the decoder of this user are transmitted to the security module of the concerned multimedia unit. Firstly, the security module verifies if it disposes of the necessary rights to access the content. If this is the case, the security module decrypts the control messages ECM in order to extract the control words cw. These control words are then returned to the decoder that uses them to decode the content.

As previously indicated, the security module according to an embodiment of this invention contains a counter. A predetermined value is introduced into this counter during personalization. This value can be a numerical value or a duration in particular. This security module also contains a final expiration date that cannot be modified and that is the date beyond which this module will no longer be able to function. It also contains a register provided to receive an intermediate validity date. During personalization, this register can be left empty. However, it is also possible to introduce a date during the personalization, this date being for example the date of personalization or a relatively close date.

The security module can also contain a credit that represents a sum of money loaded into this module. This credit is also loaded during personalization or afterwards, for example at the time of the purchase of the module by a user.

When a user has acquired a security module in order to gain access to Pay-TV content, this module can be introduced into any suitable decoder. When the user requires access to an encrypted content, the process of the invention first includes a verification step of the intermediate validity date. If the register containing this date is empty or it contains a date before the present date, the process is continued by a step of reading of the counter value of the security module.

If the value of the counter is comprised within a range that authorizes decryption, the security module decrypts the control message ECM in order to extract the control word cw from said message. Then the security module returns this control word cw to said multimedia unit. In practice, it is normal to use a numerical value that is not zero, for example 180 as the initial value of the counter and to decrease the value of the counter by 1 unit during each decryption. In the case in which the cryptoperiod, namely the interval between two successive control word changes is 10 seconds, the value of 180 corresponds to the decryption of 1800 seconds, that is to say 30 minutes of content. As previously indicated, the counter value can also be a duration, for example 30 minutes. In this case, the authorized decryption time is independent of the cryptoperiod. Instead, a time measuring device may be used, other than the counting of the number of control decrypted messages ECM. In particular these devices can use a clock contained in the decoder or the absolute time sent by the management centre. In this case, the start time of decryption of a control message is stored. During each decryption, the duration between this decryption start time and the actual time is calculated. This duration is subsequently compared to the duration contained in the counter. Access to data is authorized only if the calculated duration is lower than the duration stored in the counter.

The management centre sends at regular intervals an authorization message EMM containing an intermediate validity date. According to a preferred embodiment, the authorization messages EMM contain one or more ranges of identification numbers of the security modules to which an intermediate validity date and a counter value must be sent. The security modules whose identification number does not appear in any of the ranges of the authorization messages will not therefore receive a new intermediate validity date and the counter will not be re-initialized. In this way, the security modules whose unique identification number is not contained in an authorization message EMM are deactivated passively.

It should be noted that, according to the size of the authorization messages EMM and the space necessary to send all the concerned ranges, it is possible to generate only one or alternatively several authorization messages EMM. These messages can be sent to groups of security modules or to all the modules. According to one alternative, the authorization messages EMM can be sent individually, by using the unique identification numbers of the security modules.

When such an authorization message EMM is received by the multimedia unit of a user, it is decrypted by extracting from said message on one hand the intermediate validity date and on the other hand the new counter value. These two data are stored in suitable locations of the security module.

During uses subsequent to the first use, the intermediate validity date of the module is read. This is represented by step 10 of FIG. 1. This validity date is compared to the present date. It is then verified, in step 11, whether the present date is later or prior to the stored intermediate validity date. If the present date is prior to the intermediate validity date, decryption develops in a conventional way, which is represented by step 12 in FIG. 1.

The value of the counter is unchanged and the process is terminated, which is represented by step 13.

During the comparison step, if it is determined that the present date is after the intermediate validity date, the value of the counter is read during step 14. This value is compared, in step 15, to the range of values for which decryption is authorized. In an embodiment carrying out the aim of the described example, the range of values for which decryption is authorized extends from 1 to 180 inclusive. If this counter value is outside the authorized decryption range, in our example, if this value is zero, the display of the data or access to this data is blocked. This blocking can be carried out by the blocking of decryption in the security module or at another level in the decoder. This blocking is represented by step 16 of FIG. 1. The process is stopped, which corresponds to step 13. It should be noted that the verification of the counter value and the validity date allows the blocking of all or part of the functionalities of the security module, such as for example the use of an existing credit or the charging of a supplementary credit.

During step 15, if it is determined that the value of the counter is comprised within an authorized decryption range, namely that this value is superior to zero or comprised between 1 and 180 in our example, a control message ECM is decrypted and the value of the counter is modified according to a pre-established rule. According to one particular embodiment, the value is decreased from 1. This decrease can be carried before or after the decryption of the control message ECM, which corresponds to step 17 of FIG. 1.

According to a different embodiment, the value of the counter could be zero at the beginning and could be increased during decryption. The locking would then be carried out when the counter reaches a preset limit. It is also possible to decrease the counter by different values according to the broadcast content. The counter could be decreased by one unit during the diffusion of a film and by two units during the diffusion of a sports match.

Figure 2:
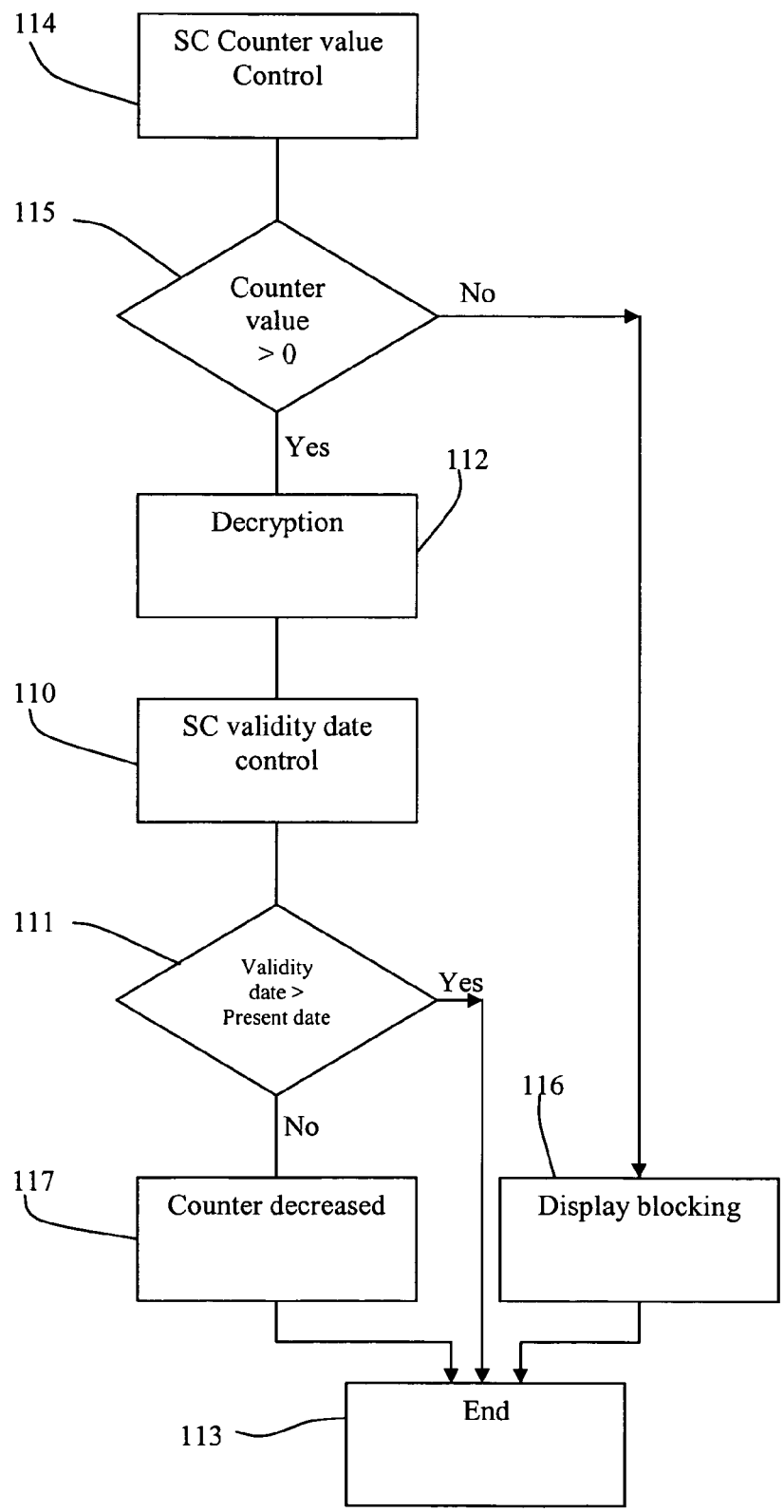
FIG. 2 shows a variant of the method of the invention.

The process of at least one embodiment of the invention has been described with reference to FIG. 1, according to an embodiment in which the comparison step between the validity date and the present date is carried out before the control step of the value of the counter. FIG. 2 shows a variant in which the steps similar to those of FIG. 1 have reference numbers increased by 100. According to this alternative shown in FIG. 2, it is also possible to begin the process with step 114 for reading the value contained in the counter. This step is followed by step 115 that aims to determine if the value of the counter is comprised within the authorized decryption range, namely that this value is superior to 0. If this value is outside the authorized decryption range, or in our example, if it is zero, access to data is prohibited, which is illustrated by step 116. If this value is not zero, the control word is decrypted in step 112. The intermediate validity date is then read during step 110 and is compared to the present date in step 111. If the present date is after the intermediate validity date, the counter is decreased according to the pre-established rule, corresponding to step 117. If not, this counter value is not modified and the access to data is authorized.

As indicated previously, the security module can also include a credit. The process of the invention can also include, before any other step, a verification step of the credit remaining in the module. This verification is carried out in the following way. When a user indicates that he wishes to gain access to a determined content to which a predefined amount is associated, the module verifies if it contains a credit superior or equal to the amount associated to the required content. If this is the case, the process such as that previously explained is initialized. If this process leads to the decryption of the data, the credit is decreased to the amount associated to the event and the new credit is stored.

If the process corresponding to steps with references from 10 to 16 does not lead to the decryption of the data, the credit is not modified.

If the initial credit is lower than the amount associated to the necessary content, the access right to the event is not given and the content cannot be visualized. According to the embodiment chosen, it is possible to allow the charging of a supplementary credit in the security module or on the contrary, to prevent this charge.

Any of the aforementioned methods may be embodied in the form of a system or device, including, but not limited to, any of the structure for performing the methodology illustrated in the drawings.

Further, any of the aforementioned methods may be embodied in the form of a program. The program may be stored on a computer readable media and is adapted to perform any one of the aforementioned methods when run on a computer device (a device including a processor). Thus, the storage medium or computer readable medium, is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, such as floppy disks (trademark), cassette tapes, and removable hard disks; media with a built-in rewriteable non-volatile memory, such as memory cards; and media with a built-in ROM, such as ROM cassettes.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A method for access control to conditional access data in a multimedia unit including at least one external security module, the method comprising:
    receiving, by the multimedia unit, at least one control message containing at least one control word;
    transmitting the control message to said at least one external security module, the control message being associated to a message decryption right;
    determining a validity date of the control message decryption rights associated to said external security module;
    determining the present date; and
    comparing the present date with the validity date of the decryption rights and determining whether the present date is prior to the validity date, wherein
        when the present date is prior to the validity date, the method includes, decrypting the at least one control message in the external security module and sending the control word to said multimedia unit from the external security module; and
        when the present date is not prior to the validity date, the method includes reading a value stored in a counter of the external security module and comparing the stored value with a range of values authorizing decryption, and determining whether the compared value is within the range, wherein
            when the stored counter value is within the authorized range, the method includes, modifying the value of the counter according to a desired rule, decrypting the at least one control message and sending the at least one control word from the external security module to said multimedia unit; and
            when the stored counter value is not within the authorized range, the method includes blocking access to said conditional access data, and wherein
                the at least one external security module is immediately operational to grant access to the conditional access data when connected to the multimedia unit without receiving an activation message from a management centre.

2. The method according to claim 1, wherein the multimedia unit receives, according to preset time intervals, an authorization message including a validity date, the validity date being later than the present date, and stored in the external security module.

3. The method according to claim 2, wherein the authorization message further includes a value reinitializes the counter and that is stored in the counter of the external security module.

4. The method according to claim 3, wherein the reinitialized value stored in the counter is a numerical value, this numerical value representing a number of the at least one control message that the external security module is authorized to decrypt.

5. The method according to claim 3, wherein the reinitializing value stored in the counter is a time duration, the time duration being a duration of the conditional access data that the external security module is authorized to decrypt.

6. The method according to claim 1, wherein the range of values authorizing decryption is between 1 and a threshold value greater than 1, a limit reached on modifying the counter value is within the range of values, and modifying the value of the counter includes decreasing the value stored in the counter.

7. The method according to claim 6, wherein the value of the counter is decreased by at least one unit each time the at least one control message is decrypted.

8. The method according to claim 7, wherein the value of the counter is decreased by a plurality of units depending on the content associated to the decrypted at least one control message.

9. A method for access control to conditional access data in a multimedia unit including at least one external security module, the method comprising:
- receiving, by the multimedia unit, at least one control message containing at least one control word;
- transmitting the at least one control message to said at least one external security module, the control message being associated to a message decryption right;
- reading of a value stored in a counter of the at least one external security module;
- comparing the stored counter value with a decryption authorizing range to determine whether the stored value is within the decryption authorizing range, wherein
  - when the stored value is not within the authorized decryption range, the method includes blocking access to said conditional access data; and
  - when the stored value is within the authorized decryption range, the method includes, decrypting the control message in the at least one external security module and sending the control word from the at least one external security module to said multimedia unit;
- determining a validity date of the control message decryption rights associated to said external security module;
- determining the present date;
- comparing the present date with the validity date of the decryption rights; and
- determining whether the present date is prior to the validity date, wherein
  - when the present date is prior to the expiration date, the method includes authorizing access to conditional access data, and
  - when the present date is not prior to the validity date, the method includes modifying the value of the counter stored in the external security module according to a desired rule and authorizing access to conditional access data, and wherein
    - the at least one external security module is immediately operational to grant access to the conditional access data when connected to the multimedia unit without receiving an activation message from a management centre.

10. The method according to claim 9, wherein the multimedia unit receives, according to preset time intervals, an authorization message including a validity date, the validity data being later than the present date and stored the at least one external security module.

11. The method according to claim 10, wherein the authorization message further includes a value that reinitializes the counter and is stored in the counter of the external security module.

12. The method according to claim 11, wherein the reinitializing value stored in the counter is a numerical value, this numerical value representing a number of the at least one control message that the at least one external security module is authorized to decrypt.

13. The method according to claim 11, wherein the reinitializing value stored in the counter is a time duration, the time duration being a duration of the conditional access data that the at least one security module is authorized to decrypt.

14. The method according to claim 9, wherein the range of values authorizing decryption is between 1 and a threshold value greater than 1, a limit reached on modifying the counter value is within the range of values, and modifying of the value of the counter includes decreasing the value stored in the counter.

15. The method according to claim 14, wherein the value of the counter is decreased by at least one unit each time the at least one control message is decrypted.

16. The method according to claim 15, wherein the value of the counter is decreased by a plurality of units depending on the content associated to the decrypted the at least one control message.

17. An external security module configured to access conditional access data, wherein the external security module includes means for implementing the method of claim 1.

18. An external security module configured to access conditional access data, wherein the external security module includes means for implementing the method of claim 9.

* * * * *